US010331880B2

(12) United States Patent
Chung

(10) Patent No.: US 10,331,880 B2
(45) Date of Patent: Jun. 25, 2019

(54) TOUCH TERMINAL AND PASSWORD GENERATION METHOD THEREOF

(71) Applicant: NEOPAD, INC., Seoul (KR)

(72) Inventor: Hee Sung Chung, Seoul (KR)

(73) Assignee: Neopad, Inc., Seoul (KR)

( * ) Notice: Subject to any disclaimer, the term of this patent is extended or adjusted under 35 U.S.C. 154(b) by 103 days.

(21) Appl. No.: 15/038,800

(22) PCT Filed: Jan. 16, 2014

(86) PCT No.: PCT/KR2014/000468
§ 371 (c)(1),
(2) Date: May 24, 2016

(87) PCT Pub. No.: WO2015/105226
PCT Pub. Date: Jul. 16, 2015

(65) Prior Publication Data
US 2017/0160897 A1    Jun. 8, 2017

(30) Foreign Application Priority Data

Jan. 8, 2014    (KR) ........................ 10-2014-0002134

(51) Int. Cl.
| G06F 21/46 | (2013.01) |
| G06F 3/0488 | (2013.01) |
| G06F 21/31 | (2013.01) |
| G06F 3/041 | (2006.01) |
| G06F 21/36 | (2013.01) |

(52) U.S. Cl.
CPC .............. G06F 21/46 (2013.01); G06F 3/041 (2013.01); G06F 3/0488 (2013.01); G06F 21/31 (2013.01); G06F 21/36 (2013.01)

(58) Field of Classification Search
CPC ...... G06F 3/0488; G06F 3/04883; G06F 3/41; G06F 21/36; G06F 21/45; G06F 21/46
See application file for complete search history.

(56) References Cited

U.S. PATENT DOCUMENTS

| 6,209,104 | B1 * | 3/2001 | Jalili | ....................... G06F 21/36 340/5.8 |
| 2005/0162407 | A1 * | 7/2005 | Sakurai | ................... G06F 21/36 345/173 |

(Continued)

FOREIGN PATENT DOCUMENTS

| CN | 102067150 A | 5/2011 |
| JP | 2000-99471 A | 4/2000 |

(Continued)

OTHER PUBLICATIONS

English translation of JP 2012-181716, Inventors Yamashita Kimiaki, Assignee KDDI Corp. (Year: 2012).*

(Continued)

*Primary Examiner* — William Boddie
*Assistant Examiner* — Saifeldin E Elnafia
(74) *Attorney, Agent, or Firm* — Westerman, Hattori, Daniels & Adrian, LLP

(57) ABSTRACT

A password generation method of a touch terminal includes receiving a touch input on a display from a user, obtaining touch information which obtains at least one of location information, color information or touch time interval information of a point where a touch is input, receiving account information, and combining the touch information with the account information to generate a password.

11 Claims, 10 Drawing Sheets

(56) References Cited

U.S. PATENT DOCUMENTS

| | | | | |
|---|---|---|---|---|
| 2009/0213132 A1* | 8/2009 | Kargman | ................ | G06F 21/36 |
| | | | | 345/581 |
| 2010/0154039 A1* | 6/2010 | Carolan | ................. | G06F 21/46 |
| | | | | 726/5 |
| 2012/0272311 A1* | 10/2012 | Althammer | ............. | G06F 21/36 |
| | | | | 726/16 |
| 2014/0053254 A1* | 2/2014 | Sun | ........................ | G06F 21/36 |
| | | | | 726/7 |

FOREIGN PATENT DOCUMENTS

| | | |
|---|---|---|
| JP | 2004-280518 A | 10/2004 |
| JP | 2012-181716 A | 9/2012 |
| KR | 10-2011-0031328 A | 3/2011 |
| KR | 10-1302367 B1 | 9/2013 |

OTHER PUBLICATIONS

Search Report for International Application No. PCT/KR2014/000468.

SIPO Office Action, dated Mar. 20, 2018, for Chinese Patent Application No. 201480072821.4 which corresponds to the above-identified U.S. application.

JPO Office Action, dated Feb. 13, 2018, for Japanese Patent Application No. 2016-555423 which corresponds to the above-identified U.S. application.

\* cited by examiner

Combine
① POS    ( XY                          )   ✓
② COL    ( RGBB                        )   ✓
③ TIME   ( 20131225123617              )   ✓
④ NAME   ( brad lee                    )   ✓
⑤ ID     ( xxxx@gmail.com              )   ✓
⑥ PW Key ( Psy                         )   ✓
⑦ ······

| ① | ② | ③ |
|---|---|---|

(              XYRGBB20131225123617              )

TOUCH TERMINAL AND PASSWORD GENERATION METHOD THEREOF

TECHNICAL FIELD

The present invention relates to a password generation method of a touch terminal and the touch terminal executing the method, more particularly, to a method of generating a password needed for performing log-in, unlocking, user authentication or the like using a variety of devices provided with a touch panel and maintaining security using the password.

BACKGROUND ART

Recently, as the Internet or the like is spread widely, web sites operated by membership increase, and use of electronic payment or online based banking services also increase rapidly.

Usually, a general membership based website is operated in a method of performing user authentication by confirming the ID and the password of a user who desires to log into the website after collecting IDs and passwords of members.

In addition, the electronic payment or the online based banking service issues a certain certificate to a terminal of a user and when the user desires to use the electronic payment or the online based banking service, it receives a password, of the certificate from the user and performs authentication on the user.

In such an existing user authentication method, the user's password can be easily exposed by a third person in that the method is operated based on a password configured of only a character string including numerals, alphabet letters and the like. In order to prevent exposure of the password, a complicated password is used recently by combining letters, symbols, numerals, special characters and the like.

Although the conventional security techniques require to set a password as complicated as possible in order to enhance safety of the password, users have a burden of remembering the complicated password as the password is getting more complicated. Contrarily, if a user uses a simple password to easily remember the password, there is a problem in that the security is difficult to maintain. That is, utilization and safety of a password have a kind of trade-off relation with each other.

Various methods are proposed to improve the problem. For example, a method called as a Rhythmic Password has been proposed, and in this method, a password is set by adding a rhythm between numerals when the numerals of the password configured of four digits are input, and the rhythms, as well as each of the numerals, should be matched to unlock the password.

As another example, there is a technique referred to as Timepass, and it has a characteristic of using a pattern of time difference to identify a password by putting a time difference between numerals in inputting a four-digit number.

Although the techniques described above insist that passwords are easy to remember and very safe and the burden of a user for remembering the password can be lessened to some extent compared with a password of a high order digit, possibility of the password to be illegally used by a third person still exists.

Meanwhile, techniques replacing a password with biometric information of a human being, such as a pattern of a finger print, an iris, a voice or a vein, are commercialized instead of using an existing password method, and although these biometric password techniques do not have the burden of remembering a password and are less likely to be illegally used, a biometric device should be included in a terminal or the like, and thus the cost increases according thereto, and the possibility of generating a problem such as personal information leakage or the like is high.

Accordingly, it needs to present a password generation technique which can minimize exposure of a user's password.

DISCLOSURE OF INVENTION

Technical Problem

Therefore, the present invention has been made in view of the above problems, and it is an object of the present invention to provide a method of generating a password, which can be easily used by a user and, at the same time, shows an excellent ability of maintaining security.

Another object of the present invention is to provide a method of setting complexity of a password to meet various situations.

Technical Solution

To accomplish the above objects, according to one aspect of the present invention, there is provided a password generation method of a touch terminal, the method comprising the steps of: receiving a touch input on a display from a user; acquiring touch information including at least any one of position information, color information and touch time information of the touch input point; receiving account information; and generating a password by combining the touch information and the account information. At this point, a specific image set by the user may be displayed on the display. Meanwhile, the password generation method may further include, before the account information receiving step, the step of displaying a keypad for inputting the account information in an area corresponding to the touch input point.

Meanwhile, the password generation step may generate the password by selectively combining at least any two of the position information, the color information, the touch time information and the account information, and at this point, the password generation method may further include, before the password generation step, the step of selecting a type of information to be used for password generation among the position information, the color information, the touch time information and the account information by the user.

In another embodiment of the present invention, the password generation method may further include, after the Password generation step, the steps of: receiving a touch input for a second point on the display from the user; and matching the touch information of the second point to the generated password, and in this case, the password generation method may further include, after the password matching step, the step of setting a second password for the second point. Meanwhile, the touch information acquisition step may acquire the position information and the color information, including a point within a predetermined distance from the touch input point.

In another embodiment of the present invention, the password generation method may further include the step of receiving an input related to a lifespan of the password from the user, and the password generation step generates a password matching to the lifespan, and at this point, the password generation step may generate the password, including the touch time information.

The various embodiments of the password generation method of the present invention can be embodied in the form of a computer-readable recording medium, in which a program for executing the method is recorded.

On the other hand, a touch terminal of the present, invention may include: a touch display for receiving a touch input or account information from a user; a touch information acquisition unit for acquiring at least any one of position information, color information and touch time information of the touch input point; and a password generation unit for generating a password by combining the touch information and the account information. The touch display may display a keypad for inputting the account information in an area corresponding to the touch input point.

Meanwhile, the password generation unit may generate the password by selectively combining at least any two of the position information, the color information, the touch time information and the account information, and at this point, the touch display receives a type of information to be used for password generation among the position information, the color information, the touch time information and the account information from the user, and the password generation unit generates the password using the information selected by the user.

Meanwhile, in an embodiment of the present invention, the touch terminal may further include a password matching unit, in which the touch display receives a touch input for a second point from the user, and the password matching unit matches position information or color information of the second point to the generated password. The password matching unit may set a password for the second point. The touch information acquisition unit may acquire the touch information, including a point within a predetermined distance from the touch input point.

In another embodiment of the present invention, the touch display may receive an input related to a lifespan of the password from the user, and the password generation unit may generate a password matching to the lifespan, and at this point, the password generation unit may generate the password, including the touch time information.

Advantageous Effects

According to the present invention, a password that can be easily used by a user and, at the same time, shows an excellent ability of maintaining security can be generated.

Furthermore, complexity of a password can be set to meet various situations, and security can be reinforced through an intuitive behavior of a user.

BRIEF DESCRIPTION OF THE DRAWINGS

FIGS. 6A and 6B are views showing a method of generating a password according to an embodiment of the present invention.

FIG. 9 is a view showing an example of generating a password by selectively combining information according to an embodiment of the present invention.

BEST MODE FOR CARRYING OUT THE INVENTION

Details of the objects and technical configurations of the present invention described above and operational effects according thereto will be further clearly understood hereinafter according to the detailed descriptions based on the drawings accompanied in the specification of the present invention.

Hereinafter, the present invention will be described in detail with reference to the accompanying drawings.

Figure 1:
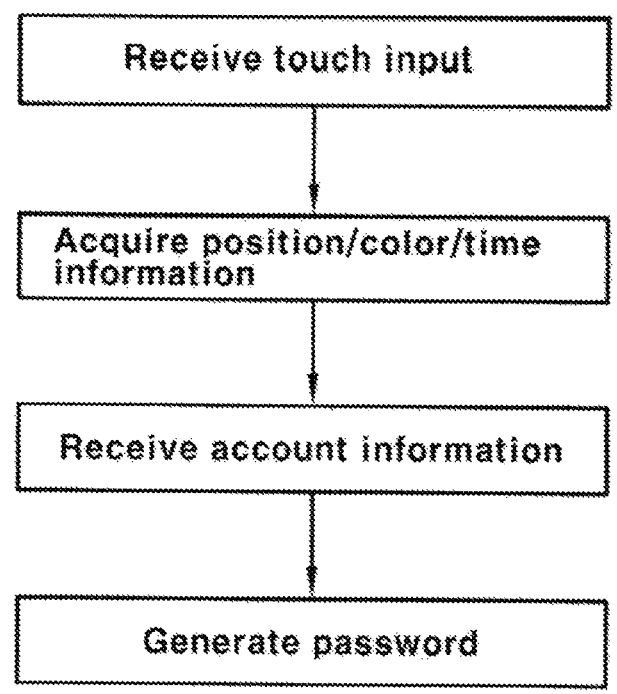
FIG. 1 is a flowchart illustrating a password generation method of a touch terminal according to an embodiment of the present invention.

FIG. 1 is a flowchart illustrating a password generation method of a touch terminal according to an embodiment of the present invention.

A password generation method presented in the Present invention includes the steps of receiving a touch input on a display from a user; acquiring touch information including at least any one of position information, color information and touch time information of the touch input point; receiving account information; and generating a password by combining the touch information and the account information.

A touch terminal mentioned in this specification includes all kinds of terminals including a touchpad as an input means to receive an input of a user and capable of displaying the input onto the touchpad on the display. Various devices such as a smart phone, a tablet PC and the like correspond to the touch terminal, and the type of a device is not limited as far as the method of the present invention can be executed.

The touch terminal of the present invention receives a touch input on the display from a user, and at this point, the touch input from the user becomes basic information for generating a password. The user first touches a specific point, accurately, a specific point on the display that the user desires to include in his or her unique password, to generate or set a password. Then, a password is generated based on the touch input.

Figure 3:
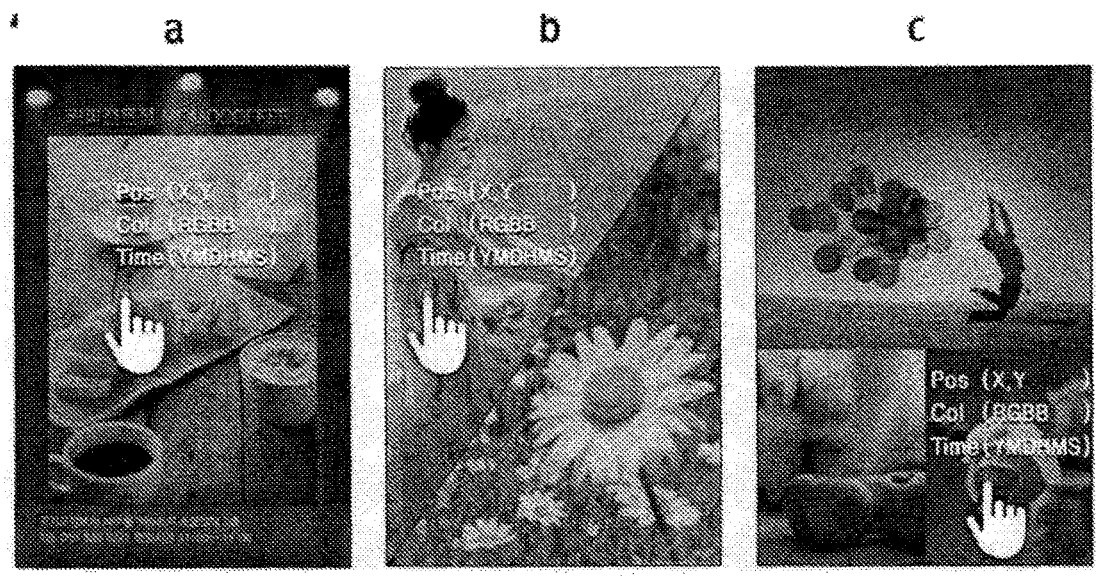
FIG. 3 is a view showing an example of acquiring touch information by a touch terminal of the present invention.

After receiving the touch input from the user, the touch terminal acquires at least any one of position information, color information and touch time information of the touch input point. This will be described with reference to FIG. 3. FIG. 3 is a view showing an example of acquiring touch information by a touch terminal of the present invention.

In this step, position information Pos (X, Y) of the Point where the user touches, color information Col (R, G, B, B) of the point and information on the touched time Time (YMDHMS) are acquired. The RGB of the color information means, a ratio of red, green and blue, and the last B represents brightness. Y among the time information represents year, M represents month, D represents day, H represents hour, M represents minute, and S represents second.

However, the RGBB and the YMDHMS are merely an example of a format for displaying a data, and the position, color and time information can be acquired in a different format.

The position information, the color information and the touch time information are basic information used for setting a password. If the user only selects a position or an object on the display desired by the user, more specifically, a position easy to remember or desired to be set as a password by the user in an image displayed on the display, the touch terminal of the present invention acquires position information, color information and touch time information of the corresponding point and generates a password by combining the information. Since the user may use a point that only the user can remember to generate a password only through a simply touch, user's convenience can be improved, and, in addition, since the user may combine a password using the touch information generated by the touch, this is advantageous in maintaining security.

Figure 4:
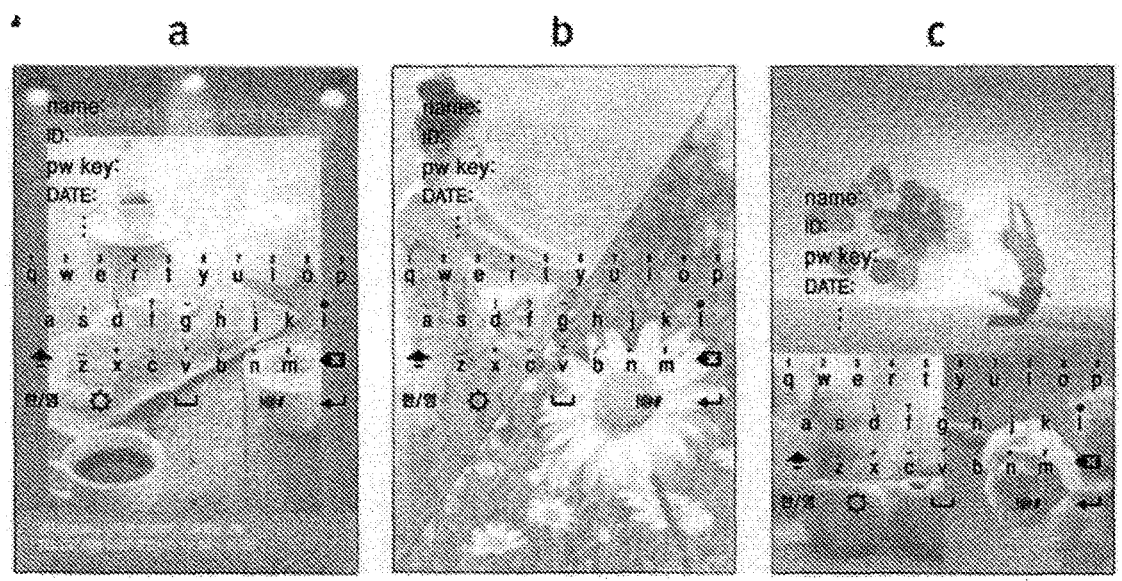
FIG. 4 is a view showing an example of displaying a keypad and receiving account information by a touch terminal of the present invention.

At this point, a specific image set by the user can be displayed on the display of the touch terminal. Since the user can generate a password based on the image set by the user, the user may generate a password by using a point that the user himself or herself can easily remember while other persons are difficult to remember. FIG. 4 shows three examples. FIG. 4a shows an example of setting one image, FIG. 4b shows an example of partitioning the display into two frames and setting an image in each of the frames, and FIG. 4c shows an example of partitioning the display into three frames and setting an image in each of the frames.

Since a different image is displayed in each case, a different password can be generated since the color information is different according to the displayed image although the position information is the same. Contrarily, since the user may generate and use a different password within one touch terminal according to the display image, stability of the password, can be enhanced.

It is very easy for a user to remember an object or a point that the user has selected in different images since a kind of intuition is used, whereas it is very difficult for other people to illegally use a password if the password is generated according to the present invention since it is very difficult for other people to steal the intuition of the user.

After acquiring the touch information, the touch terminal receives account information from the user. The present invention does not generate a password only by touching a specific position on the display, but uses a combination of touching the specific position and using the account information. This can be regarded as a kind of double security, and since the password is generated by reflecting both of two intuitive security factors, the Present invention is advantageous in that the user can easily remember the password and, at the same time, stability of the security can be improved. Meanwhile, since the security can be sufficiently maintained by the double security of the Present invention although the password used for the account information is not intentionally set to be complicated as described above in the conventional technique, the burden of the user for remembering the password can be lessened.

An ID and a password used for log-in in an online space can be used as the account information, or a four-digit password, an unlocking mechanism according to pattern recognition or the like currently much used in a smart phone can be included. However, hereinafter, an example using an ID and a password will be mainly described.

FIG. 4 is a view showing an example of displaying a keypad and receiving account information by a touch terminal of the present invention. When a password is set, a keypad for inputting account information is displayed as shown in FIG. 4, and although a QWERTY-type keypad is shown in FIG. 4, this is only an example, and various types of keypads can be displayed. At this point, the keypad for inputting the account information can be displayed in an area corresponding to a point touched by the user. Accordingly, the user may set a password while minimizing movements on the touch display. Seeing a, b and c of FIG. 4, it can be confirmed that keypads are displayed at different positions.

The touch terminal of the present invention generates a password by combining touch information and account information after receiving the touch information and the account information.

Figure 5:
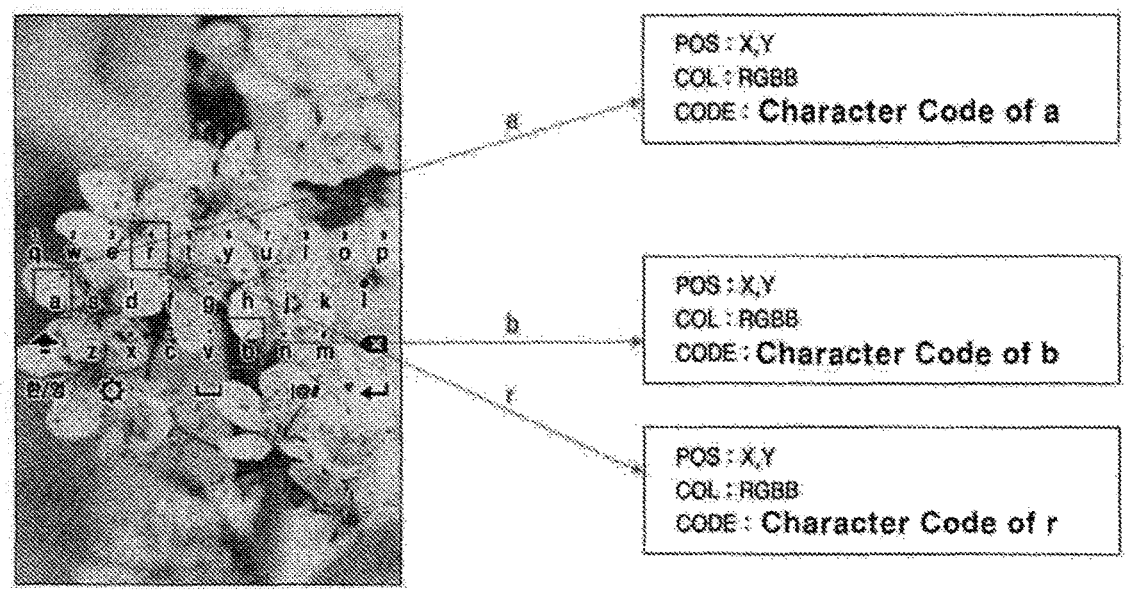
FIG. 5 is a view showing an example of acquiring touch information and account information to generate a Password by a touch, terminal of the present invention.

FIG. 5 is a view showing an example of acquiring touch information and account information to generate a password by a touch terminal of the present invention. The position information is acquired as two-dimensional coordinates, and the color information is acquired as RGBB information, and the account information is acquired as a character code, e.g., an ASCII code, or the like of characters input by the user using the keypad. Then, a password is generated by combining the information acquired as described above.

Figure 6B:
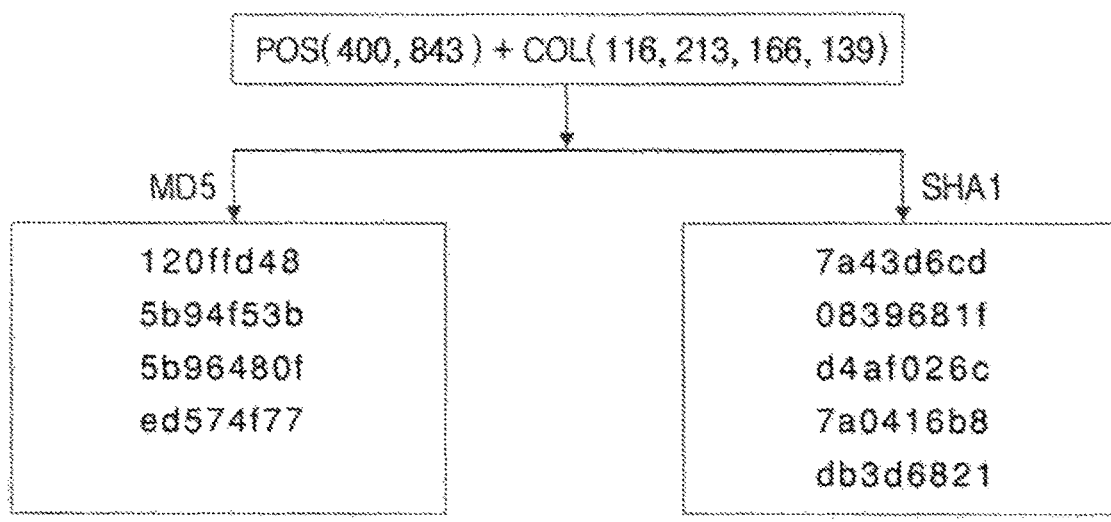

A further specific, example of generating a password is shown in FIGS. 6A and 6B, and the password can be generated by arranging the acquired information in parallel (A) or by combining the acquired information and encoding the combined data using a hash function or the like, or a specific encryption process can be performed based on the acquired information (B). FIG. 6B shows examples respectively applying a Message Digest (MD) technique and a Secure Hash Algorithm (SHA). However, this is only an example, and the present invention is not limited to this.

If a password is generated through the process described above, this can be utilized for security of the touch terminal.

In an embodiment of the present invention, the password generation step may generate a password by selectively combining at least any two of the position information, the color information, the touch time information and the account information, and to this end, a step of selecting a type of information to be used for password generation among the position information, the color information, the touch time information and the account information by the user can be further included before the password generation step.

According to this embodiment, although a user touches the same point, various passwords can be generated according to selection of the user. If the user selects only the position information and the color information without selecting the account information, a password can be generated only by touching a specific point, and touching the specific point is sufficient when the password is unlocked at a later time. This case is useful when it needs to simply set the security. Contrarily, when it definitely needs to maintain the security, for example, in the case of a financial transaction, a complicated password can be generated by using all the position information, the color information, the touch time information and the account information. That is, complexity of the password can be controlled according to the object of the user. This is expressed as a diagram in FIG. 9.

Figure 9:
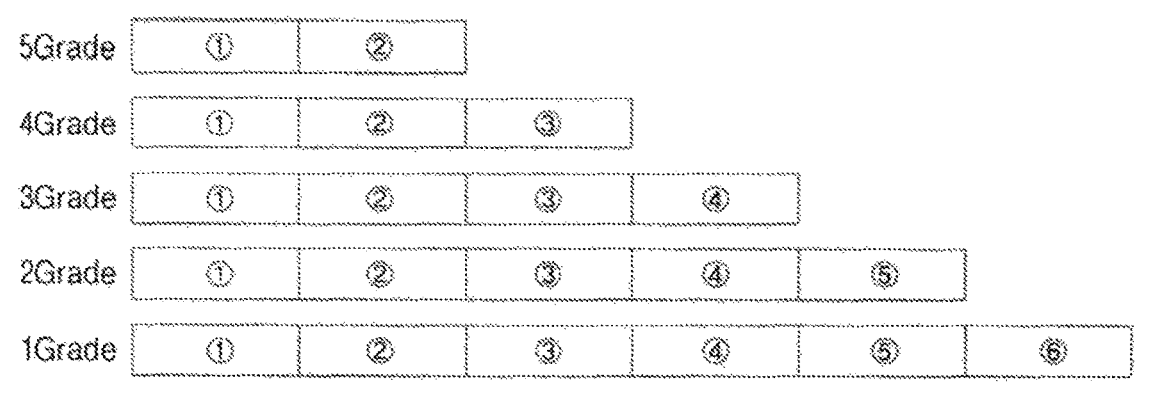

FIG. 9 is a view showing an example of generating a password by selectively combining information according to an embodiment of the present invention. Grade 5 shown in FIG. 9 generates a password using only two pieces of information, and Grade 1 generates a password using six pieces of information. In the example shown in FIG. 9, the password is getting more complicated as it goes to Grade 1 from Grade 5, and as a result, stability of the password is enhanced. Like this, the present invention may control the stability and convenience of a password according to selection of a user.

Meanwhile, the password generation method may further include, after the password generation step, the steps of receiving a touch input for a second point on the display from the user and matching the touch information of the second point to the generated password. This embodiment will be described with reference to FIG. 7.

Figure 7:
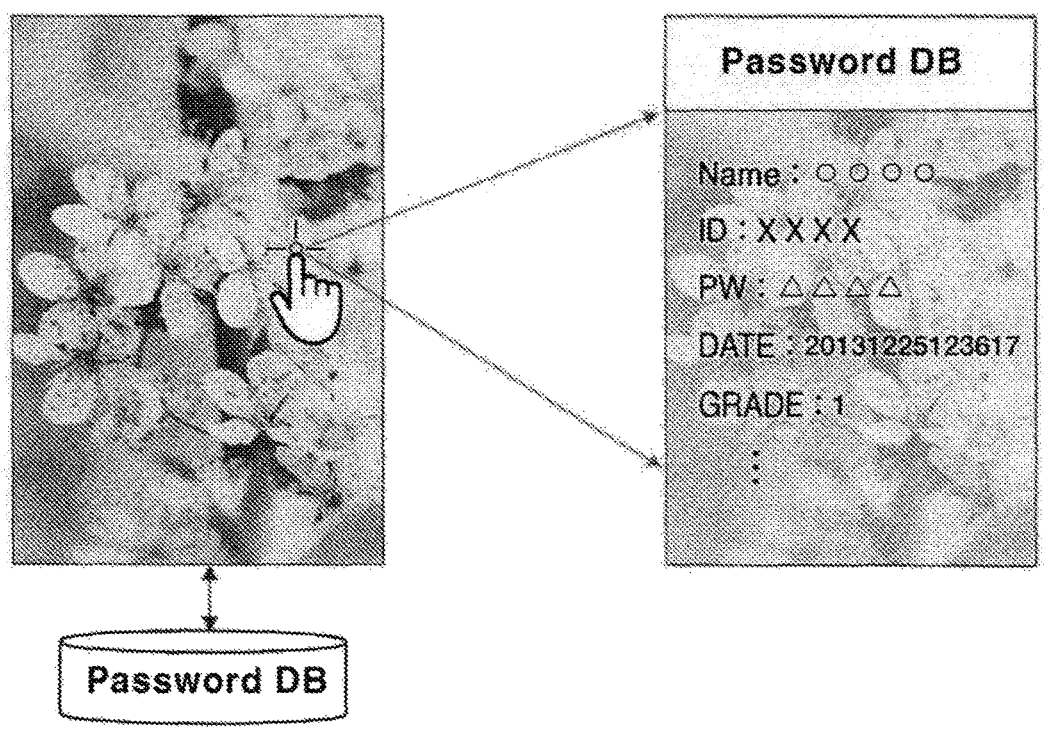
FIG. 7 is a view showing a process of matching a password according to an embodiment of the present invention.

FIG. 7 is a view showing a process of matching a password according to an embodiment of the present invention. The present invention may include this embodiment in order to replace the process of directly inputting the account information by the user with a more convenient motion.

The user receives a touch input for another point (a second point) on the display, in addition to the point for setting a password. The input point is used for loading the account information, and touch input information for the second point, more specifically, information generated using the position information, the color information or the touch time information (hereinafter, referred to as password generation information), is matched to the password.

The user may automatically input the account information by touching the second point, instead of inputting the account information. As a result, the user may conveniently perform log-in, unlocking or the like by using a password generated by the present invention without memorizing the account information every time.

Meanwhile, in addition to the embodiment described above, the password generation method may further include, after the password matching step, a step of setting a second password for the second point. This is setting a kind of a security mechanism when the password generation information is fetched. Although the second point is exposed, user's security can be maintained by requesting the user to input the password one time after touching the second point. Considering the object of the present invention (inputting account information through a simple motion), the second password is preferably set as a simple password. However, the present invention is not limited to this.

In an embodiment of the present invention, the step of acquiring touch information acquires the position information and the color information, including a point within a predetermined distance from the touch input point. The display of the touch terminal is divided into extremely small pixel units, and when a user touches the display, it is very difficult to select only one pixel. In most cases, several pixels are touched simultaneously. Accordingly, the present invention needs to identify a center point pixel in a selection area by the user. Meanwhile, an identified center point pixel may not match to a pixel touched by the user when the password is generated.

Accordingly, when the touch information is acquired, the present invention acquires the position information and the color information, including a point within a Predetermined distance from the touch input point. That is, when a password is generated, the password is generated by recognizing a pixel positioned within a predetermined radius from a pixel identified as a center point also as a pixel the same as the center pixel, and when the password is unlocked at a later time, the password can be unlocked although the center point pixel is not exactly matched.

A password generation method according to another embodiment of the present invention further includes a step of receiving an input related to the lifespan of the password from the user, and at this point, the password generation step generates a password matching to the lifespan. This embodiment is described with reference to FIG. 8.

Figure 8:
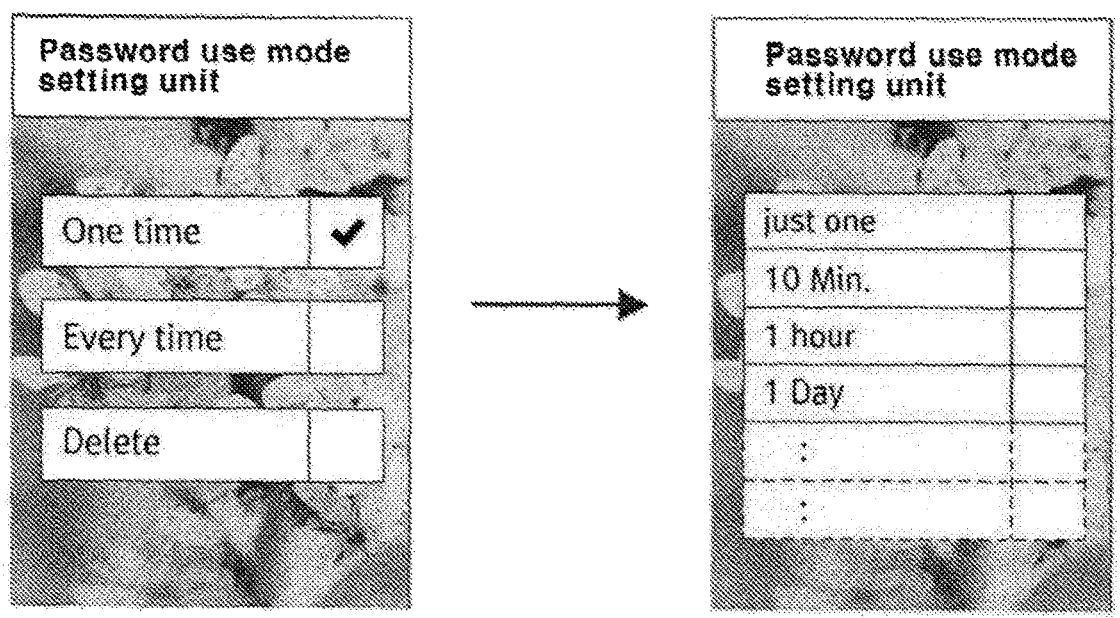
FIG. 8 is a view showing an example of setting a lifespan of a password according to an embodiment of the present invention.

FIG. 8 is a view showing an example of setting a lifespan of a password according to an embodiment of the present invention. A user may set a time period for using a password generated using the present invention. Ten minutes, one hour, one day, one week or continuous use can be selected. According to this embodiment, since the user can be persuaded to periodically change the password, it is effective in maintaining security. Meanwhile, in this embodiment, when a password is generated, the password is generated to include touch time information. The lifespan of the password is determined based on the time information at the time point of generating the password.

The password generation method of a touch terminal according to various embodiments of the present invention can be embodied in the form of a computer-readable recording medium in which a program for executing the method is recorded, and a device for creating and distributing the program in the form of an application is also included in the recording medium.

Hereinafter, the touch terminal of the present invention will be described.

Figure 2:
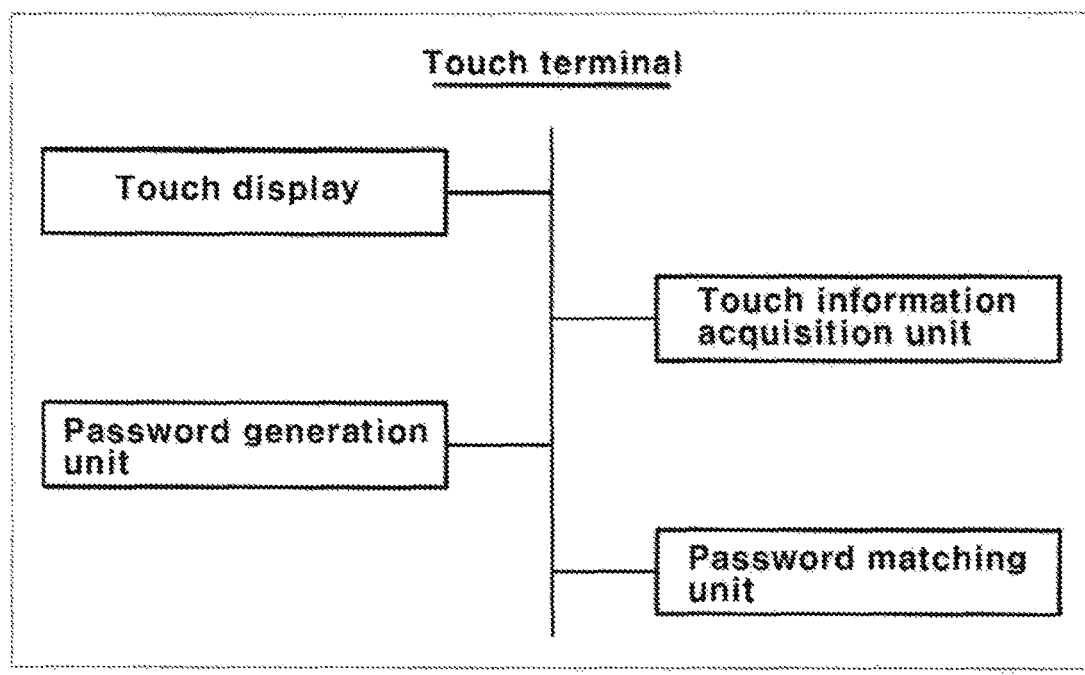
FIG. 2 is a block diagram showing the structure of a touch terminal according to an embodiment of the present invention.

FIG. 2 is a block diagram showing the structure of a touch terminal according to an embodiment of the present invention.

A touch terminal according to an embodiment of the present invention includes: a touch display for receiving a touch input or account information from a user; a touch information acquisition unit for acquiring at least any one of position information, color information and touch time information of the touch input point; and a password generation unit for generating a password by combining the touch information and the account information.

At this point, the touch display may enhance user's convenience by displaying a keypad for inputting the account information in an area corresponding to the touch input point.

Meanwhile, the password generation unit may generate a password by selectively combining at least any two of the position information, the color information, the touch time information and the account information, and accordingly, complexity of the password can be set in accordance to the need of the user. At this point, the touch display of the touch terminal of the present invention receives a type of information to be used for password generation among the position information, the color information, the touch time information and the account information from the user, and the password generation unit generates a password using the information selected by the user. Since detailed contents related thereto have been described already through FIG. 6, overlapped description will be omitted.

Meanwhile, the touch terminal according to an embodiment of the present invention may further include a Password matching unit, in which the touch display receives a touch input for a second point from the user, and the Password matching unit matches position information or color information of the second point to the generated password, and since the password matching unit may set a password for the second point, security can be reinforced.

The touch information acquisition unit may acquire the touch information, including a point within a Predetermined distance from the touch input point. Accordingly, even when the user simultaneously touches several pixels or the center point pixel is not accurately matched, a password can be set or unlocked.

Meanwhile, the touch display of the present invention receives an input related to the lifespan of the password from the user, and the password generation unit may set the lifespan of the password by generating a password matching to the lifespan, and at this point, the password generation unit may generate a password, including the touch time information.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

The invention claimed is:

1. A password generation method of a touch terminal, the method comprising the steps of:
    displaying a specific image selected by a user on a touch terminal display frame of the user;
    receiving user's touch input information of a specific point on the displayed image;
    acquiring position information of a pixel of the user touch input point and color information of a pixel of the user touch input point; and
    generating a password by combining the pixel position information of the user touch input point and the pixel color information of the user touch input point,
    wherein the number of specific images selected by the user on the touch terminal display is one or more images,
    wherein the pixel position information is acquired as two-dimensional coordinates of a pixel corresponding to the touch input point, and the pixel color information is acquired as RGB information of the pixel corresponding to the touch input point, and
    wherein one or a plurality of images selected by the user to generate one or a plurality of passwords using the position information and the color information of the touch input pixels on the specific image is displayed on one touch terminal display frame or on a partitioned display frame according to the number of the selected images.

2. The method according to claim 1, further comprising receiving account information before the password generation step, wherein the password is generated by combining the account information and the position information and the color information of the touch input point.

3. The method according to claim 2, further comprising displaying a keypad for inputting the account information in an area corresponding to the touch input point, wherein the area where the keypad is displayed is different according to the touch input point received from the user.

4. The method according to claim 1, further comprising receiving an input related to a lifespan of the password from the user, wherein the password generation step generates the password by combining the position information and the color information of the touch input point, and the lifespan of the password.

5. A password generation method of a touch terminal, the method comprising the steps of:
    receiving user's first touch input information of a first specific point on a displayed image after displaying a specific image selected by the user on a touch terminal display frame of the user;
    acquiring position information of a pixel of the user's first touch input point and color information of a pixel of the user's first touch input point;
    generating a first password by combining the pixel position information of the user's first touch input point and the pixel color information of the user's first touch input point;
    receiving user's second touch input information of a second specific point on the displayed image;
    acquiring position information of a pixel of the user's second touch input point and color information of a pixel of the user's second touch input point; and
    generating a second password by combining the pixel position information of the user's second touch input point and the pixel color information of the user's second touch input point,
    wherein the number of specific images selected by the user on the touch terminal display is one or more images, and
    wherein one or a plurality of images selected by the user to generate one or a plurality of passwords using the position information and the color information of the touch input pixels on the specific image is displayed on one touch terminal display frame or on a partitioned display frame according to the number of the selected images.

6. The method according to claim 5, wherein the first password is generated by combining the position information and the color information of the first point and account information, and wherein the account information is automatically loaded and input by touching the second point.

7. A touch terminal comprising:
    a touch display for receiving a touch input from a user on a specific image selected by the user on a touch terminal display frame of the user;
    a touch information acquisition processor for acquiring pixel position information and pixel color information of a touch input point on the specific image selected by the user; and
    a password generation processor for generating a password by combining the pixel position information and the pixel color information of the touch input point,
    wherein the number of specific images selected by the user on the touch terminal display is one or more images,
    wherein the pixel position information is acquired as two-dimensional coordinates of a pixel corresponding to the user touch input point, and the pixel color information is acquired as RGB information of the pixel corresponding to the user touch input point, and
    wherein one or a plurality of images selected by the user to generate one or a plurality of passwords using the position information and the color information of the touch input pixels on the specific image is displayed on one touch terminal display frame or on a partitioned display frame according to the number of the selected images.

8. The touch terminal according to claim 7,
    wherein the touch display displays a keypad for inputting account information in an area corresponding to the touch input point,
    wherein the area where the keypad is displayed is different according to the touch input point received from the user, and wherein the password generation unit generates the password by combining the account information and the position information and the color information of the touch input point.

9. The touch terminal according to claim 7,
wherein the touch display receives an input related to a lifespan of the password from the user, and
wherein the password generation unit generates the password by combining the position information and the color information of the touch input point, and the lifespan of the password.

10. A touch terminal comprising:
a touch display for receiving user's first touch input information of a first specific point on a displayed image after displaying a specific image selected by the user on a touch terminal display frame of the user;
a touch information acquisition processor for acquiring position information of a pixel of the user's first touch input point and color information of a pixel of the user's first touch input point;
a first password generation processor for generating a first password by combining the pixel position information and the pixel color information of the user's first touch input point;
a touch display for receiving user's second touch input information of a second specific point on the displayed image;
a touch information acquisition processor for acquiring position information of a pixel of the user's first touch input point and color information of a pixel of the user's second touch input point; and
a second password generation processor for generating a second password by combining the pixel position information and the pixel color information of the user's second touch input point,
wherein the number of specific images selected by the user on the touch terminal display is one or more images,
wherein the pixel position information is acquired as two-dimensional coordinates of a pixel corresponding to the user touch input point, and the pixel color information is acquired as RGB information of the pixel corresponding to the user touch input point, and
wherein one or a plurality of images selected by the user to generate one or a plurality of passwords using the position information and the color information of the touch input pixels on the specific image is displayed on one touch terminal display frame or on a partitioned display frame according to the number of the selected images.

11. The touch terminal according to claim 10,
wherein the password generation unit generates the password by combining the position information and the color information of the first point and account information, and
wherein the account information is automatically loaded and input by touching the second point.

* * * * *